United States Patent
Gomila et al.

(10) Patent No.: US 9,628,823 B2
(45) Date of Patent: Apr. 18, 2017

(54) METHOD AND APPARATUS FOR PROVIDING REDUCED RESOLUTION UPDATE MODE FOR MULTI-VIEW VIDEO CODING

(75) Inventors: Cristina Gomila, Princeton, NJ (US); Yeping Su, Camas, WA (US); Peng Yin, West Windsor, NJ (US)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 1442 days.

(21) Appl. No.: 12/087,020

(22) PCT Filed: Jan. 9, 2007

(86) PCT No.: PCT/US2007/000348
§ 371 (c)(1),
(2), (4) Date: Jun. 24, 2008

(87) PCT Pub. No.: WO2007/081838
PCT Pub. Date: Jul. 19, 2007

(65) Prior Publication Data
US 2009/0028249 A1    Jan. 29, 2009

Related U.S. Application Data

(60) Provisional application No. 60/757,292, filed on Jan. 9, 2006, provisional application No. 60/757,289, filed on Jan. 9, 2006.

(51) Int. Cl.
*H04N 19/86* (2014.01)
*H04N 19/597* (2014.01)
(Continued)

(52) U.S. Cl.
CPC ............ *H04N 19/86* (2014.11); *H04N 19/117* (2014.11); *H04N 19/159* (2014.11);
(Continued)

(58) Field of Classification Search
CPC ................................ H04N 7/26; H04N 19/86
(Continued)

(56) References Cited

U.S. PATENT DOCUMENTS 7,372,905 B2   5/2008 Foo et al.
7,650,036 B2   1/2010 Lei et al.
(Continued)

FOREIGN PATENT DOCUMENTS

EP        1408697        4/2004
JP        2004-096719    3/2004
(Continued)

OTHER PUBLICATIONS

Anantrasirichai, N. et al.: "Multi-View Image Coding with Wavelet Lifting and In-Band Disparity Compensation," Image Processing, 2005, ICIP 2005, IEEE International Conference in Genova, Italy, Sep. 11-14, 2005, Piscataway, NJ, pp. 33-36, XP010851389.
(Continued)

*Primary Examiner* — Yulin Sun
(74) *Attorney, Agent, or Firm* — Tutunjian & Bitetto, P.C.

(57) ABSTRACT

There are provided a video encoder, a video decoder, and corresponding encoding and decoding methods for providing adaptation of deblocking filtering for multi-view video coding. The video encoder includes a deblocking filter adaptable based on prediction information for encoding multi-view video sequences.

16 Claims, 8 Drawing Sheets

(51) Int. Cl.
*H04N 19/159* (2014.01)
*H04N 19/176* (2014.01)
*H04N 19/70* (2014.01)
*H04N 19/46* (2014.01)
*H04N 19/51* (2014.01)
*H04N 19/61* (2014.01)
*H04N 19/117* (2014.01)

(52) U.S. Cl.
CPC .......... *H04N 19/176* (2014.11); *H04N 19/46* (2014.11); *H04N 19/51* (2014.11); *H04N 19/597* (2014.11); *H04N 19/61* (2014.11); *H04N 19/70* (2014.11)

(58) Field of Classification Search
USPC .......................... 375/240.01, 240.29, 240.12
IPC ....................................................... H04N 7/26
See application file for complete search history.

(56) References Cited

U.S. PATENT DOCUMENTS

| | | | | |
|---|---|---|---|---|
| 2004/0190626 | A1* | 9/2004 | Sun et al. | 375/240.18 |
| 2005/0243911 | A1 | 11/2005 | Kwon et al. | |
| 2006/0174236 | A1* | 8/2006 | Stein et al. | 717/151 |
| 2006/0262856 | A1* | 11/2006 | Wu et al. | 375/240.19 |
| 2007/0064800 | A1* | 3/2007 | Ha | 375/240.12 |

FOREIGN PATENT DOCUMENTS

| | | |
|---|---|---|
| JP | 2005-124200 | 5/2005 |
| JP | 2005-311512 | 11/2005 |

OTHER PUBLICATIONS

ISO/IEC JTC1/SC29/WG11 N1366, ISO/IEC 13818-2, AMD 3: "MPEG-2 Multiview Profile", Sep. 1996.
Marpe, D. et al.: "Context-Based Adaptive Binary Arithmetic Coding in the H.264/AVC Video Compression Standard," IEEE Transactions on Circuits and Systems for Video Technology, vol. 13, No. 7, Jul. 2003, 17 pages.
ISO/IEC JTC1/SC29/WG11 N7567: "Updated Call for Proposals on Multi-View Video Coding", Oct. 2005.
Jens-Rainer, O. et al.: "Incomplete 3-D Multiview Representation of Video Objects," IEEE Transactions on Circuits and Systems for Video Technology, vol. 9, No. 2, Mar. 1999, 12 pages.
Li, S. et al.: "Approaches to H.264-Based Stereoscopic Video Coding," Proceedings of the Third International Conference on Image and Graphics (ICIG'04), IEEE, 4 pages.
List, P. et al.: "Adaptive Deblocking Filter," IEEE Transactions on Circuits and Systems for Video Technology, vol. 13, No. 7, Jul. 2003, 6 pages.
ISO/IEC JTC1/SC29/WG11 N6909: "Survey of Algorithms Used for Multi-view Video Coding (MVC)", Jan. 2005.
International Search Report, dated Jun. 20, 2007.
Whittmann, Steffen et al., "Intra-only 4:4:4 Profile for H.264/AVC FRExt", Joint Video Team (JV11 of ISO/IEC MPEG & ITU-T VCEG(ISO/IEC JTC1/SC29/WG11 and ITU-T SG16 Q.6), Oct. 14-21, 2005, pp. 1-18, Document: JVT-O086, Filename: JVT-O086. doc, 17th Meeting: Nice, FR, 14-21.
Huang, Yu-Wen, et al., "Analysis, Fast Algorithm, and VLSI Architecture Design for H.264/ AVC Intra Frame Coder", IEEE Transactions on Circuits and Systems for Video Technology. Mar. 2005, pp. 378-401, vol. 15. No. 3.
Haoping Yu (Thomson Inc), "Joint 4:4:4 Video Model (JFVM) 1", International Organisation for Standardisation Organisation Internationale De Normalisation ISO/IEC JTC1/SC29/WG11 Coding of Moving Pictures and Audio, Oct. 2005, pp. 1-14, Nice, France.

* cited by examiner

METHOD AND APPARATUS FOR PROVIDING REDUCED RESOLUTION UPDATE MODE FOR MULTI-VIEW VIDEO CODING

CROSS-REFERENCE TO RELATED APPLICATIONS

This application claims the benefit, under 35 U.S.C. §365 of International Application PCT/US2007/000348 filed Jan. 9, 2007, which was published in accordance with PCT Article 21(2) on Jul. 19, 2007 in English and claims priority of U.S. Provisional patent application No. 60/757,292 filed Jan. 9, 2006 and U.S. Provisional patent application No. 60/757,289 filed Jan. 9, 2006, both of which are commonly assigned and incorporated by reference in their respective entireties.

FIELD OF THE INVENTION

The present invention relates generally to video encoding and decoding and, more particularly, to a method and apparatus for providing adaptation of deblocking filtering for multi-view video coding.

BACKGROUND OF THE INVENTION

Block-based video coding algorithms may create visible blocking artifacts in the decoded images. These artifacts, caused by block-based motion compensation and residual transform coding, have extensively been studied for the encoding of single view sequences.

The deblocking filter is a proven tool to suppress visually unpleasant blocking artifacts. It has also been proved that deblocking filters can increase coding efficiency if used in the prediction loop, as in the International Organization for Standardization/International Electrotechnical Commission (ISO/IEC) Moving Picture Experts Group-4 (MPEG-4) Part 16 Advanced Video Coding (AVC) standard/International Telecommunication Union, Telecommunication Sector (ITU-T) H.264 recommendation (hereinafter the "MPEG-4 AVC standard").

The deblocking filter smoothes over the reconstructed pixels near the block boundaries. An effective deblocking filter should adjust the filtering strength according to the nature of the signal and the values of certain coding parameters. However, a high level of adaptability of the filter will introduce an undesirable high complexity in implementation.

Several previously proposed multi-view video coding (MVC) architectures include cross-view prediction to achieve better coding efficiency compared to simulcast (compressing each view independently). However, there is no previous art on deblocking filter design in the framework of multi-view video coding.

SUMMARY OF THE INVENTION

These and other drawbacks and disadvantages of the prior art are addressed by the present invention, which is directed to a method and apparatus for providing adaptation of deblocking filtering for multi-view video coding.

According to an aspect of the present invention, there is provided a video encoder. The video encoder includes a deblocking fitter adaptable based on prediction information for encoding multi-view video sequences.

According to another aspect of the present invention, there is provided a video encoding method. The method includes adapting deblocking filtering based on prediction information for encoding multi-view video sequences.

According to yet another aspect of the present invention, there is provided a video decoder. The video decoder includes a deblocking filter adaptable based on prediction information for decoding multi-view video sequences.

According to still another aspect of the present invention, there is provided a video decoding method. The method includes adapting deblocking filtering based on prediction information for decoding multi-view video sequences.

According to a further aspect of the present invention, there is provided a video signal structure for video encoding. The video signal structure includes prediction information for adapting a deblocking filter for encoding multi-view video sequences.

According to an additional aspect of the present invention, there is provided a storage media having video signal data encoded thereupon. The video signal data includes prediction information for adapting a deblocking filter for encoding multi-view video sequences.

These and other aspects, features and advantages of the present invention will become apparent from the following detailed description of exemplary embodiments, which is to be read in connection with the accompanying drawings.

BRIEF DESCRIPTION OF THE DRAWINGS

The present invention may be better understood in accordance with the following exemplary figures, in which.

DETAILED DESCRIPTION

Figure 1:
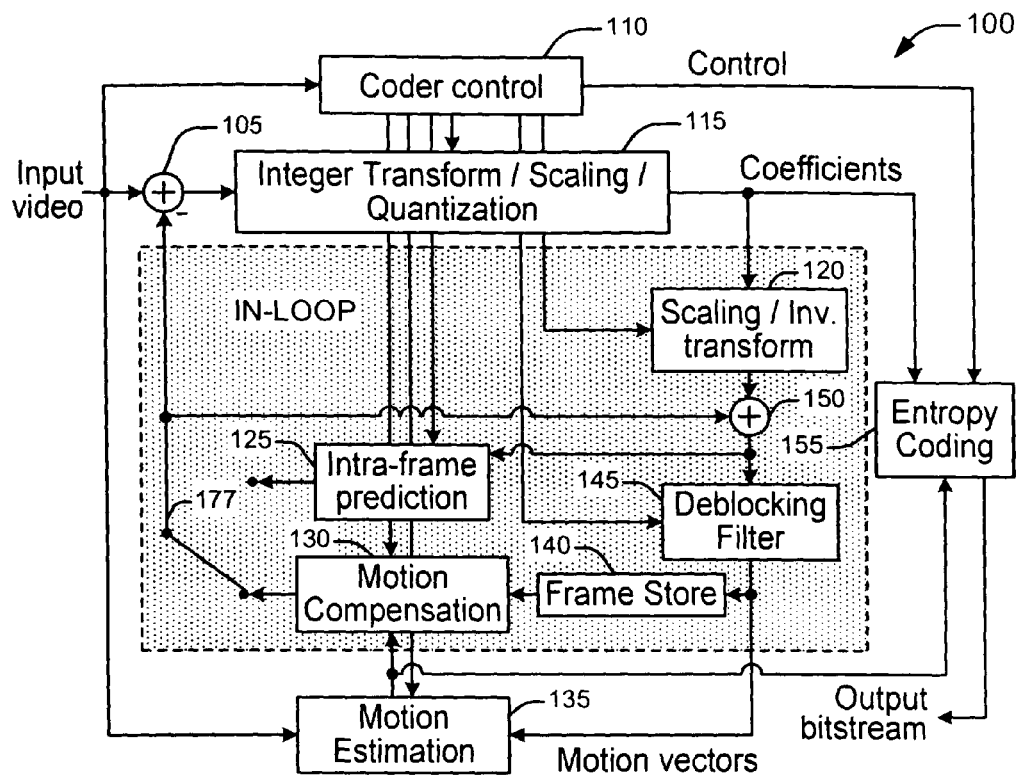
FIG. 1 is a block diagram for an exemplary encoder to which the present principles may be applied in accordance with an embodiment of the present principles.

The present invention is directed to a method and apparatus for providing adaptation of deblocking filtering for multi-view video coding.

The present description illustrates the principles of the present invention. It will thus be appreciated that those skilled in the art will be able to devise various arrangements that, although not explicitly described or shown herein, embody the principles of the invention and are included within its spirit and scope.

All examples and conditional language recited herein are intended for pedagogical purposes to aid the reader in understanding the principles of the invention and the concepts contributed by the inventor to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Furthermore, with respect to loops (e.g., performed in flow charts), reference in the specification to a particular loop looping over "each" entity such as a macroblock, picture, field, frame, block, pixel, and so forth is provided as such for exemplary purposes, and may also be deemed to refer to "one or more" of each entity and thus, not necessarily, "each", while maintaining the scope of the present principles. Thus, for example, partial encoding/decoding and/or partial deblocking may be performed in accordance with the teachings of the present principles, while maintaining the scope of the present principles.

Turning to FIG. 1, an exemplary encoder to which the present principles may be applied is indicated generally by the reference numeral 100.

The encoder 100 includes a combiner 105 having an output in signal communication with a first input of an integer transformer/scaler/quantizer 115. A first output of the integer transformer/scaler/quantizer 115 is connected in signal communication with a first input of an entropy coder 155 and a first input of a scaler/inverse transformer 120. An output of the scaler/inverse transformer 120 is connected in signal communication with a first non-inverting input of a combiner 150. An output of the combiner 150 is connected in signal communication with a first input of an intra-frame predictor 125 and a first input of a deblocking filter 145. An output of the deblocking filter 145 is connected in signal communication with an input of a frame store 140 and a first input of a motion estimator 135. An output of the motion estimator 135 is connected in signal communication with a third input of a motion compensator 130 and a third input of the entropy coder 155. An inverting input of the combiner 105 is connected in signal communication with an output of a switch 177. The output of the switch 177 is also connected in signal communication with a second non-inverting input of the combiner 150. A first input of the switch 177 is connected in signal communication with an output of the motion compensator 130. A second input of the switch 177 is connected in signal communication with an output of the intra-frame predictor 125. An output of the frame store 140 is connected in signal communication with a first input of a motion compensator 130.

An input of the encoder 100 is connected in signal communication with a non-inverting input of the combiner 105, an input of a coder control module 110, and a third input of the motion estimator 135. A first output of the coder control module 110 is connected in signal communication with a second input of the motion compensator 130. A second output of the coder control module 110 is connected in signal communication with a second input of the motion estimator 135. A third output of the coder control module 110 is connected in signal communication with a second input of the intra-frame predictor 125. A fourth output of the coder control module 110 is connected in signal communication with a second input of the integer transformer/scaler/quantizer 115. A fifth output of the coder control module 110 is connected in signal communication with a second input of deblocking filter 145. A sixth output of the coder control module 110 is connected in signal communication with a second input of the scaler/inverse transformer 120. A seventh output of the coder control module 110 is connected in signal communication with a second output of the entropy coder 155. An output of the entropy coder 155 is available as an output of the encoder 100.

Figure 2:
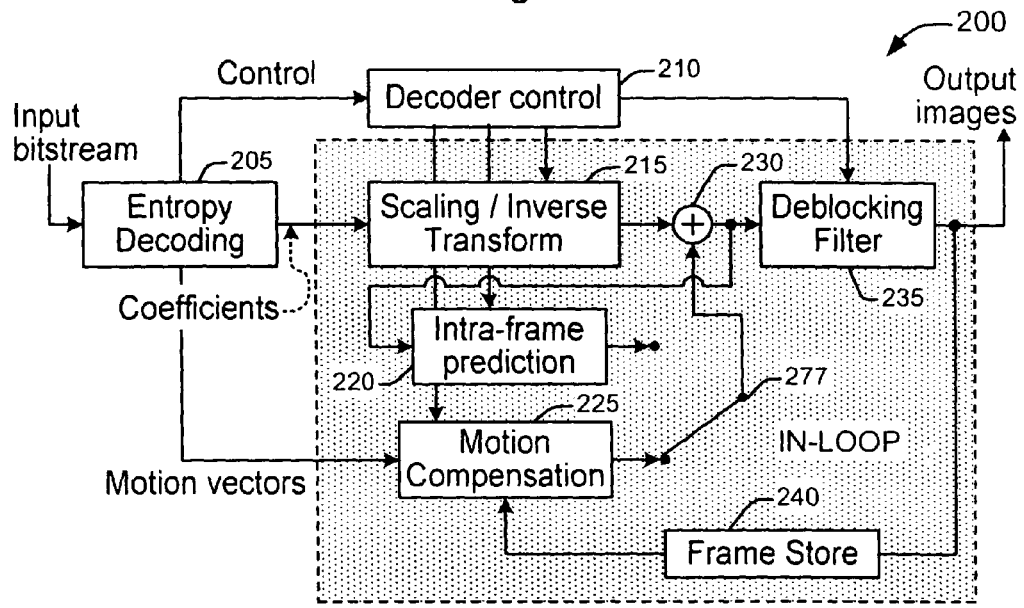
FIG. 2 is a block diagram for an exemplary decoder to which the present principles may be applied in accordance with an embodiment of the present principles.

Turning to FIG. 2, an exemplary decoder to which the present principles may be applied is indicated generally by the reference numeral 200. The decoder 200 includes an entropy decoder 205. An input to the entropy decoder 205 is available as an input to the decoder 200. A first output of the entropy decoder 205 is connected in signal communication with an input of a decoder control module 210. A first output of the decoder control module 210 is connected in signal communication with a second input of a motion compensator 225. A second output of the decoder control module 210 is connected in signal communication with a first input of an intra-frame predictor 220. A third output of the decoder control module 210 is connected in signal communication with a second input of a scaler/inverse transformer 215. A fourth output of the decoder control module 210 is connected in signal communication with a second input of a deblocking filter 235.

A second output of the entropy decoder 205 is connected in signal communication with a first input of the scaler/inverse transformer 215. An output of the scaler/inverse transformer 215 is connected in signal communication with a first non-inverting input of a combiner 230. An output of the combiner 230 is connected in signal communication with a second input of the intra-frame predictor 220 and a first input of the deblocking filter 235. An output of the deblocking filter 235 is connected in signal communication with an input of a frame store 240. An output of the frame store 240 is connected in signal communication with a third input of a motion compensator 225. A second non-inverting input of the combiner 230 is connected in signal communication with an output of a switch 277. A first input of the switch 277 is connected in signal communication with an output of the motion compensator 225. A second input of the switch 277 is connected in signal communication with an output of the intra-frame predictor 220.

A third output of the entropy decoder 205 is connected in signal communication with a first input of the motion compensator 225.

Figure 3:
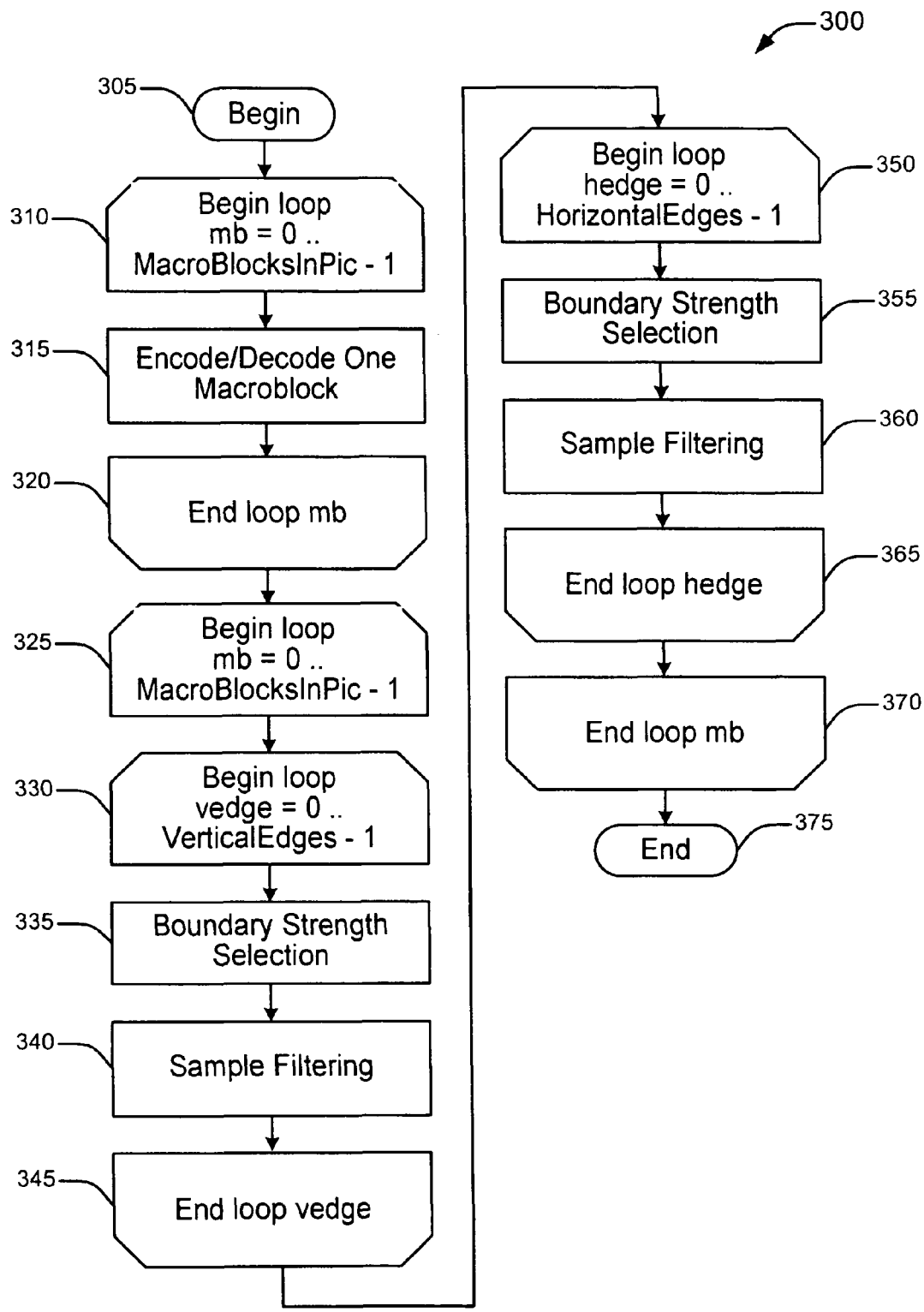
FIG. 3 is a flow diagram for an exemplary method for slice encoding/decoding for Multi-view Video Coding (MVC) in accordance with an embodiment of the present principles.

Turning to FIG. 3, an exemplary method for slice encoding/decoding for Multi-view Video Coding (MVC) in an embodiment of the present principles compliant with the MPEG-4 AVC standard is indicated generally by the reference numeral 300.

The method 300 includes a start block 305 that passes control to a loop limit block 310. The loop limit block 310 begins a loop over each macroblock including setting a range for the loop using a variable mb=0 to MacroBlocksInPic−1, and passes control to a function block 315. The function block 315 encodes/decodes' one macroblock, and passes control to a loop limit block 320. The loop limit block 320 ends the loop over each macroblock, and passes control to a loop limit block 325. The loop limit block 325 begins a loop over each macroblock including setting a range for the loop using a variable mb=0 to MacroBlocksInPic−1; and passes control to a loop limit block 330. The loop limit block 330 begins a loop over each vertical edge (vedge) of a current macroblock to be encoded/decoded including setting a range for the loop using a variables vedge=0 to VerticalEdges−1, and passes control to a function block 335. The function block 335 selects the boundary strength to be applied, and passes control to a function block 340. The function block 340 performs sample filtering, and passes control to a loop limit block 345. The loop limit block 345 ends the loop over each vertical edge (vedge) of a current macroblock, and passes control to a loop limit block 350. The loop limit block 350 begins a loop over each horizontal edge (hedge) of a current macroblock to be encoded/decoded including setting a range of the loop using a variable hedge=0 to HorizontalEdges−1, and passes control to a function block 355. The function block 355 selects the boundary strength, and passes control to a function block 360. The function block 360 performs sample filtering, and passes control to a loop limit block 365. The loop limit block 365 ends the loop over each horizontal edge (hedge), and passes control to a loop limit block 370. The loop limit block 370 ends the loop over each macroblock, and passes control to an end block 375.

Embodiments of the present principles are directed to adapting deblocking filtering for Multi-view Video Coding (MVC). Multi-view video coding (MVC) is the compression framework for the encoding of multi-view sequences. A Multi-view Video Coding (MVC) sequence is a set of two or more video sequences that capture the same scene from a different view point. As a special case to which the present principles may be applied, a stereoscopic video sequence includes two video sequences, one representing the left channel and the other representing the right channel. Frames for each channel are simultaneously captured and have different viewing angles.

An embodiment involve's suppressing the blocking artifacts introduced by enabling cross-view prediction, wherein a prediction signal is formed from a decoded picture(s) of another view(s). When such cross-view prediction is enabled, additional blockiness is typically introduced at boundaries between the pixels that are compensated from different camera views. Advantageously, this embodiment of the present principles increases the decoded picture quality by reducing the artifacts around block boundaries caused by prediction from different views. In the embodiment, prediction view information (also interchangeably referred to herein as reference view information) is introduced into the design and/or use of a deblocking filter for MVC. The reference view information indicates the views involved in the forming of a prediction signal. For example, the prediction signal can come from the previous decoded pictures of the current view or previous decoded pictures of the neighboring view. In the embodiment, such reference view information may be used, e.g., to vary (e.g., increase) the strength of the deblocking filter and/or to select a different type of filter. Given the teachings of the present principles provided herein, one of ordinary skill in this and related arts will contemplate these and various other uses for reference view information for use in adapting the deblocking filtering in Multi-view Video Coding, while maintaining the scope of the present principles.

Another embodiment involves suppressing the blocking artifacts introduced by coding multi-view video sequences using MVC by enabling both cross-view prediction and temporal prediction. In the case where two types of prediction are allowed (cross-view prediction and temporal prediction), additional blockiness is typically introduced at the boundaries between the pixels that are decoded with different MVC prediction types. Advantageously, this embodiment of the present principles increases the decoded picture quality by reducing the artifacts around block boundaries caused by different prediction types (temporal and cross-view). Since the decoded picture quality is improved, the compression efficiency may increase as well. In the embodiment, prediction type information is introduced into the design and/or use of a deblocking filter for MVC. In the embodiment, such prediction type information may be used, e.g., to vary (e.g., increase) the strength of the deblocking filter and/or to select a different type of filter. Alternatively, reference view information may be used, e.g., to vary (e.g., increase) the strength of the deblocking filter and/or to select a different type of filter. Given the teachings of the present principles provided herein, one of ordinary skill in this and related arts will contemplate these and various other uses for prediction type information for use in adapting the deblocking filtering in Multi-view Video Coding, while maintaining the scope of the present principles.

For illustrative purposes, embodiments of the present principles are described herein with respect to the MPEG-4 AVC standard. However, it should be appreciated that the present invention is not limited to the MPEG-4 AVC standard and, given the teachings of the present principles provided herein, one of ordinary skill in this and related arts will contemplate this and other video coding standards capable of Multi-view Video Coding to which the present principles may be applied, while maintaining the scope of the present principles.

It is to be appreciated that the present principles are not limited to a particular deblocking technique applied to the predicted pictures and, thus, any deblocking technique may be utilized in accordance with the embodiments of the present principles, while maintaining the scope of the present principles.

For illustrative purposes, an embodiment will now be described, regarding how to extend the deblocking filter as specified in the MPEG-4 AVC standard which adapts the strength of the deblocking filter based on some coding decisions. Hereinafter, we will refer to this option for simplicity reasons.

The deblocking filter in the MPEG-4 AVC standard applies to all edges between 4×4 blocks. Furthermore, for each edge, the deblocking filter has the capability to adapt its strength. The parameter that controls the filter strength is referred as boundary strength (Bs). The value of the boundary strength indicates the likeliness of having visual blockiness on each edge and, hence, the need for a more or less deblocking filtering. Higher values of Bs indicate that stronger deblocking filtering will be applied.

Figure 4A:
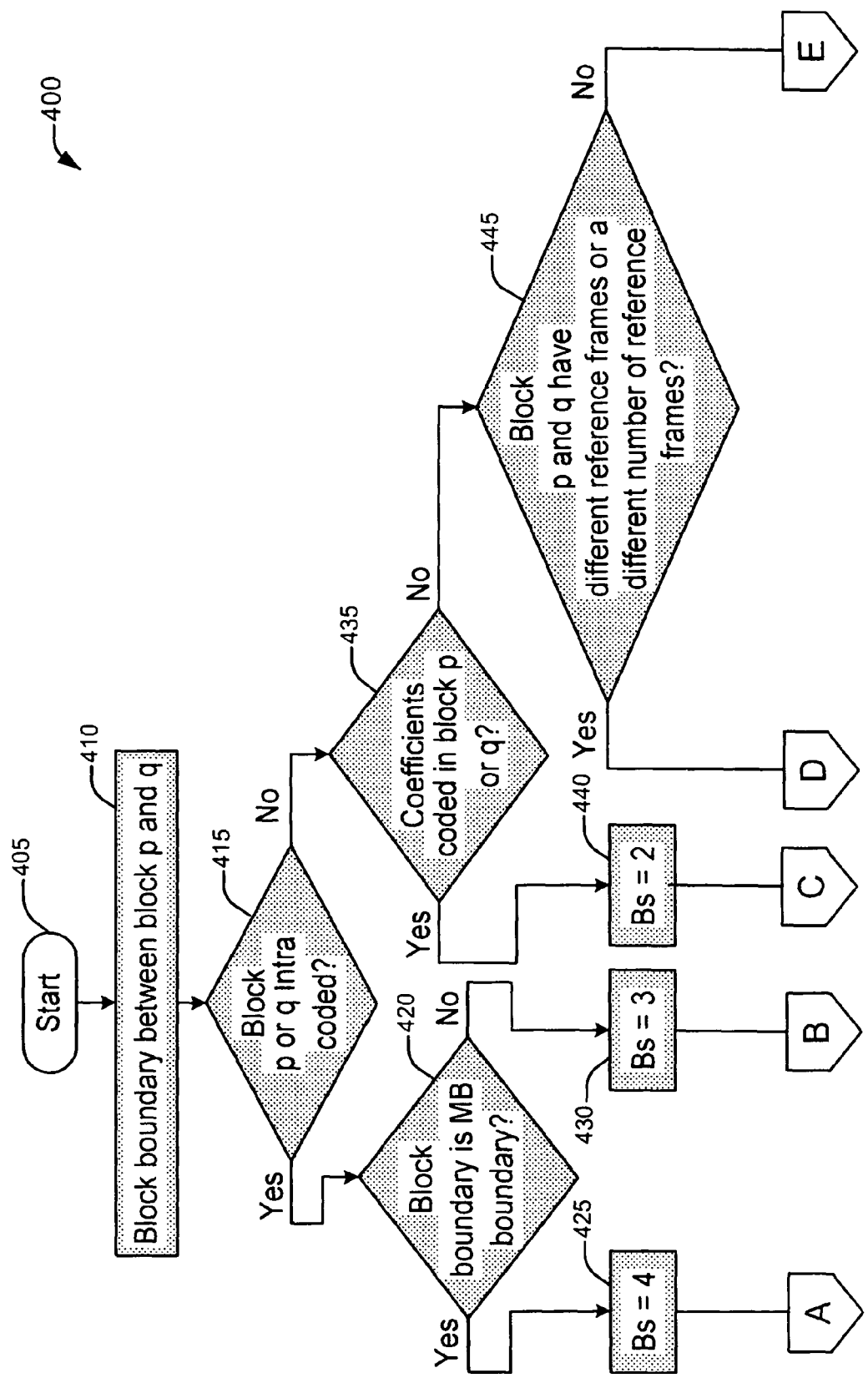
FIG. 4 is a flow diagram for an exemplary method for selecting boundary strength for use with the MPEG-4 AVC standard in accordance with an embodiment of the present principles.
Figure 4B:
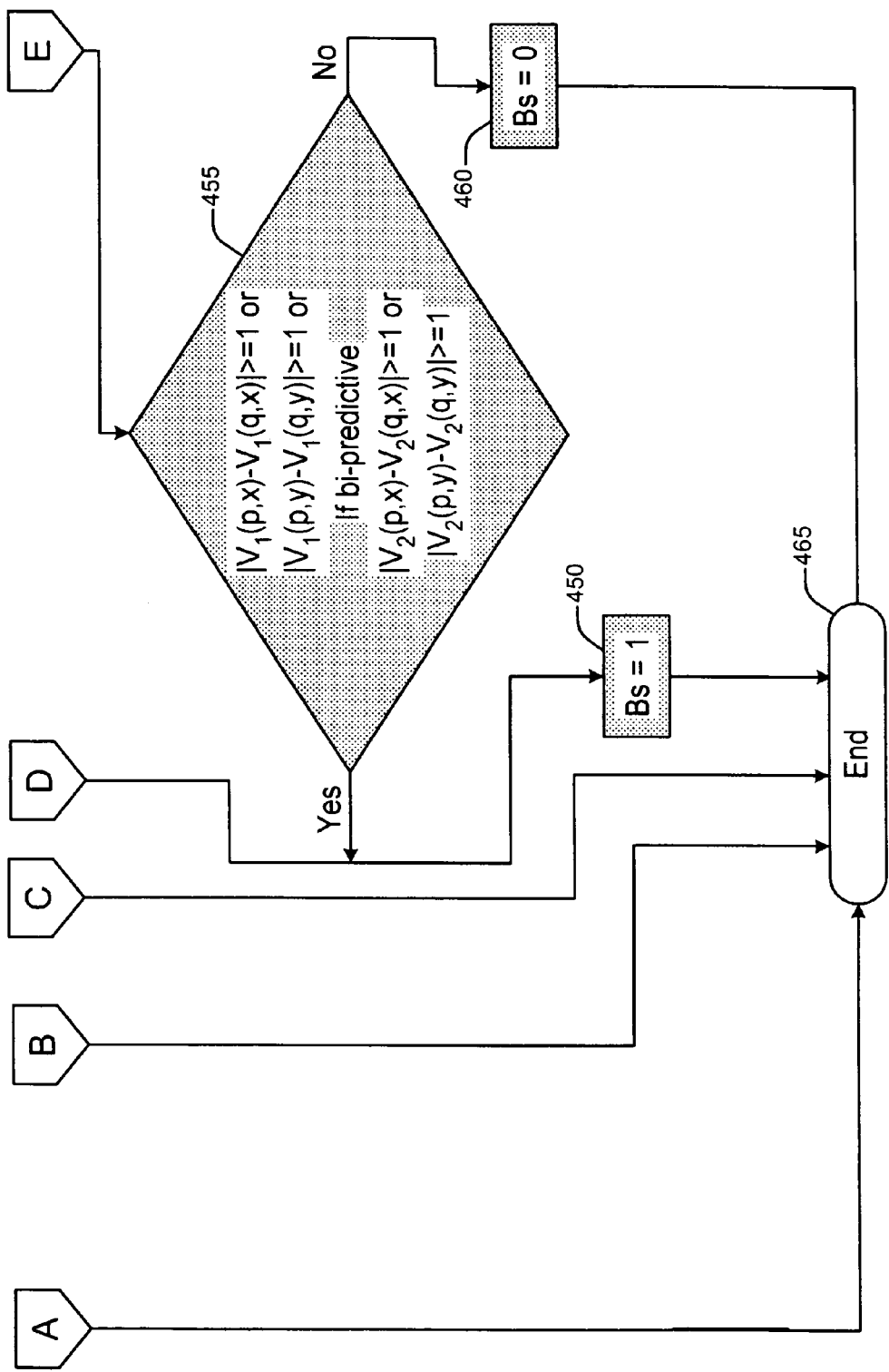

Turning to FIG. 4, an exemplary method for selecting boundary strength for use with the MPEG-4 AVC standard is indicated generally by the reference numeral 400. The method includes a start block 405 that passes control to a function block 410. The function block 410 examines the block boundary between blocks p and q, and passes control to a decision block 415. The decision block 415 determines whether or not the block p or q is intra coded. If so, then control is passed to a decision block 420. Otherwise, control is passed to a decision block 435.

The decision block 420 determines whether or not the block boundary is a macroblock boundary. If so, then control is passed to a function block 425. Otherwise, control is passed to a function block 430.

The function block 425 sets the boundary strength to 4, and passes control to an end block 465.

The function block 430 sets the boundary strength to 3, and passes control to the end block 465.

The decision block 435 determines whether or not the coefficients are coded in blocks p or q. If so, then control is passed to a function block 440. Otherwise, control is passed to a decision block 445.

The function block 440 sets the boundary strength to 2, and passes control to the end block 465.

The decision block 445 determines whether or not the blocks p and q have different reference frames or a different number of reference frames. If so, then control is passed to a function block 450. Otherwise, control is passed to a decision block 455.

The function block 450 sets the boundary strength to 1, and passes control to the end block 465.

The decision block 455 determines whether or not $|V_1(p,x)-V_1(q,x)|>=1$ or $|V_1(p,y)-V_1(q,y)|>=1$ or, if bi-predictive, $|V_2(p,x)-V_2(q,x)|>=1$ or $|V_2(p,y)-V_2(q,y)|>=1$. If so, then control is passed to function block 450. Otherwise, control is passed to a function block 460.

The function block 460 sets the boundary strength to 0, and passes control to the end block 465.

In accordance with an embodiment of the present principles, the boundary strength computation should also take into account the prediction type information in case of encoding multi-view sequences.

Figure 5A:
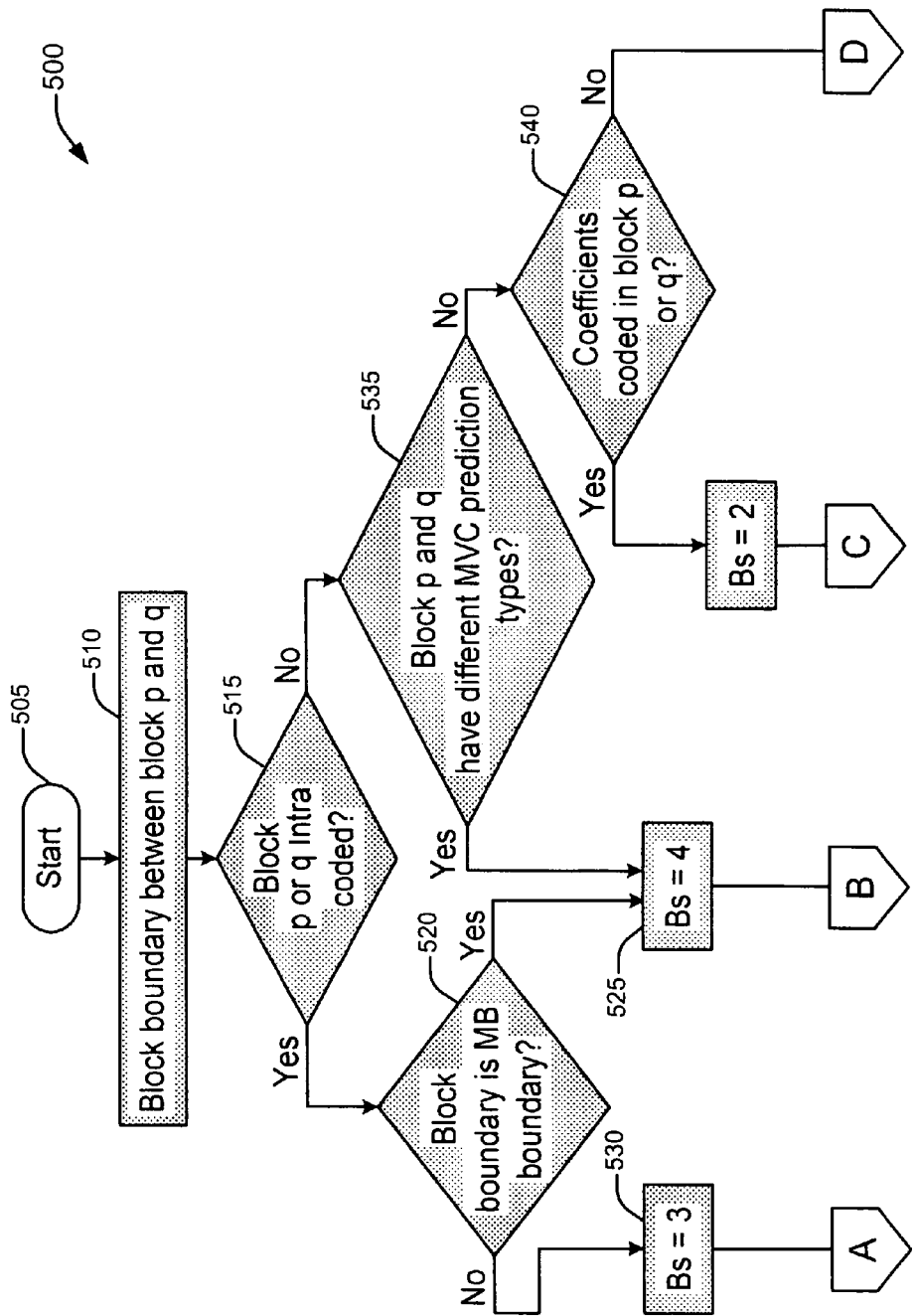
FIG. 5 is a flow diagram for an exemplary method for selecting the boundary strength based on prediction type information for use in Multi-view Video Coding based on prediction type information in accordance with an embodiment of the present principles.
Figure 5B:
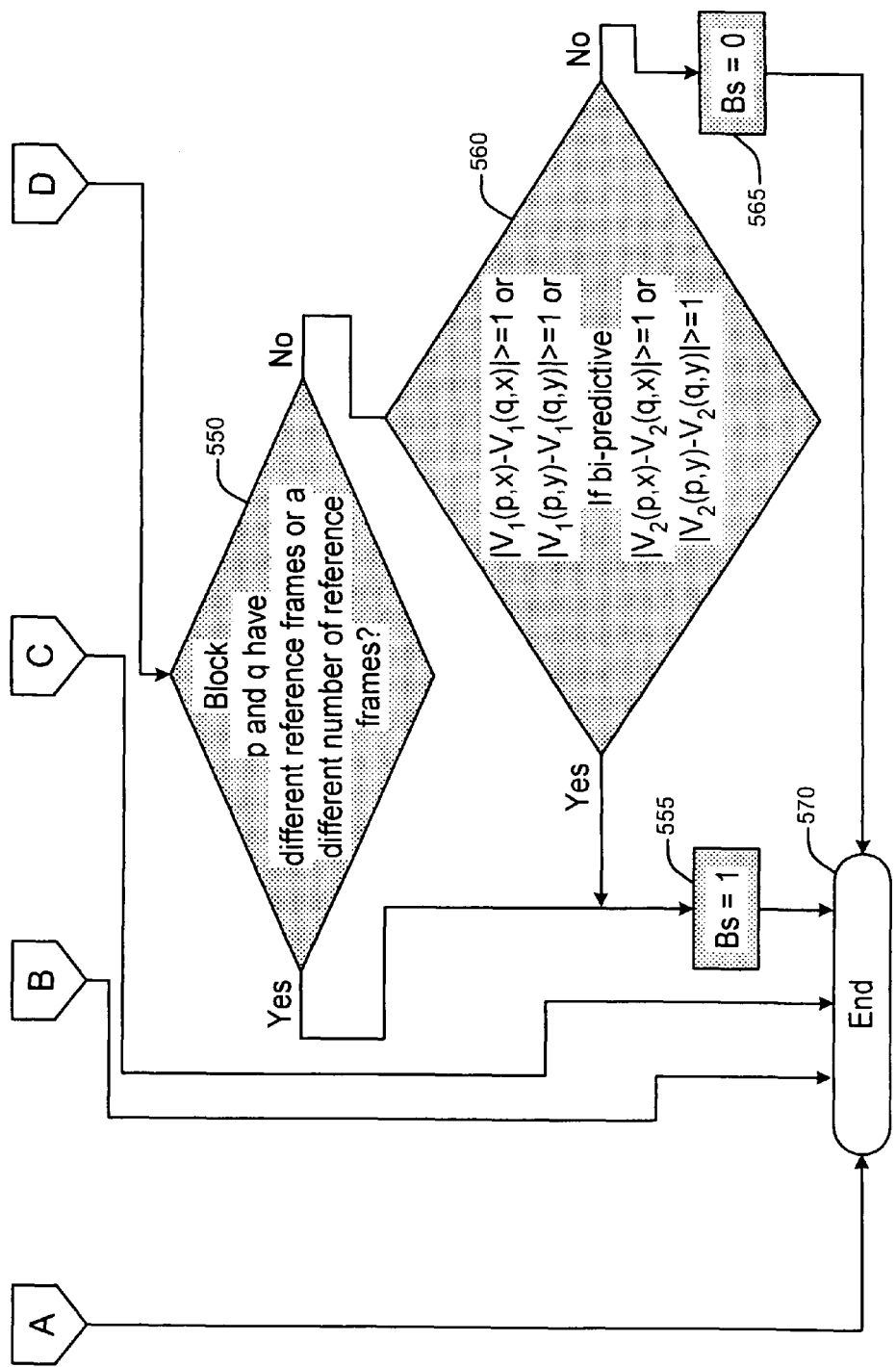

Turning to FIG. 5, an exemplary method for selecting the boundary strength based on prediction type information for use in Multi-view Video Coding is indicated generally by the reference numeral 500. In accordance with the method 500, the strength is adjusted according to the following exemplary coding parameters: MVC prediction type; edge position; block type; number of coded coefficients; reference frame index; and motion/disparity vector differences. It is to be noted that if the two neighboring blocks have different MVC prediction types, the highest boundary strength Bs=4 will be enforced. In general, the cross-view predicted block and temporal predicted block use reference pictures from different views, thus the block edge of two blocks with different MVC prediction types will more likely include higher level of blockiness. Thus, assigning higher boundary strength on these edges will give better filtering results.

The method 500 includes a start block 505 that passes control to a function block 510. The function block 510 examines the block boundary between blocks p and q, and passes control to a decision block 515. The decision block 515 determines whether or not block p or q is intra coded. If so, then control is passed to a decision block 520. Otherwise, control is passed to a decision block 535.

The decision block 420 determines whether or not the block boundary is a macroblock boundary. If so, then control is passed to a function block 525. Otherwise, control is passed to a function block 530.

The function block 525 sets the boundary strength to 4, and passes control to an end block 570.

The function block 530 sets the boundary strength to 3, and passes control to the end block 570.

The decision block 535 determines whether or not blocks p and q have difference Multi-view Video Coding prediction types. If so, then control is passed to the function block 525. Otherwise, control is passed to the decision block 540. The decision block 540 determines whether or not the coefficients are coded in the blocks p and q. If so, then control is passed to a function block 545. Otherwise, control is passed to a decision block 550.

The function block 545 sets the boundary strength to 2, and passes control to the end block 570.

The decision block 550, determines whether or not blocks p and q have different reference frames or a different number of reference frames. If so, then control is passed to the function block 545. Otherwise, control is passed to a decision block 560.

The decision block 560 determines whether or not $|V_1(p,x)-V_1(q,x)|>=1$ or $|V_1(p,y)-V_1(q,y)|>=1$ or, if bi-predictive, $|V_2(p,x)-V_2(q,x)|>=1$ or $|V_2(p,y)-V_2(q,y)|>=1$. If so, then control is passed to function block 555. Otherwise, control is passed to a function block 565.

The function block 565 sets the boundary strength to 0, and passes control to the end block 570.

In accordance with another embodiment of the present principles, the boundary strength computation should also take into account the reference view information in case of encoding multi-view sequences.

Figure 6A:
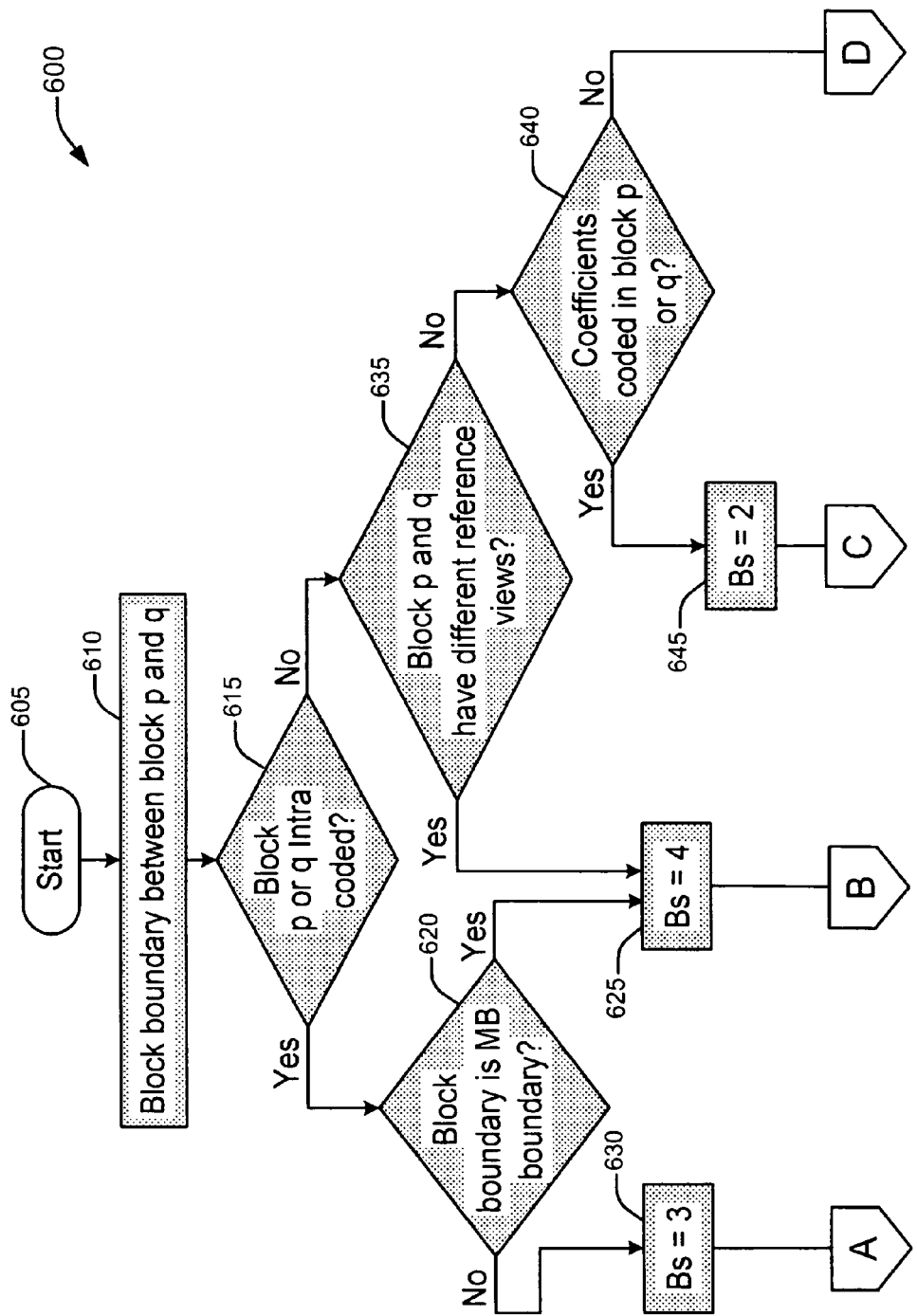
FIG. 6 is a flow diagram for an exemplary method for selecting the boundary strength based on prediction view information for use in Multi-view Video Coding based on reference view information in accordance with an embodiment of the present principles.
Figure 6B:
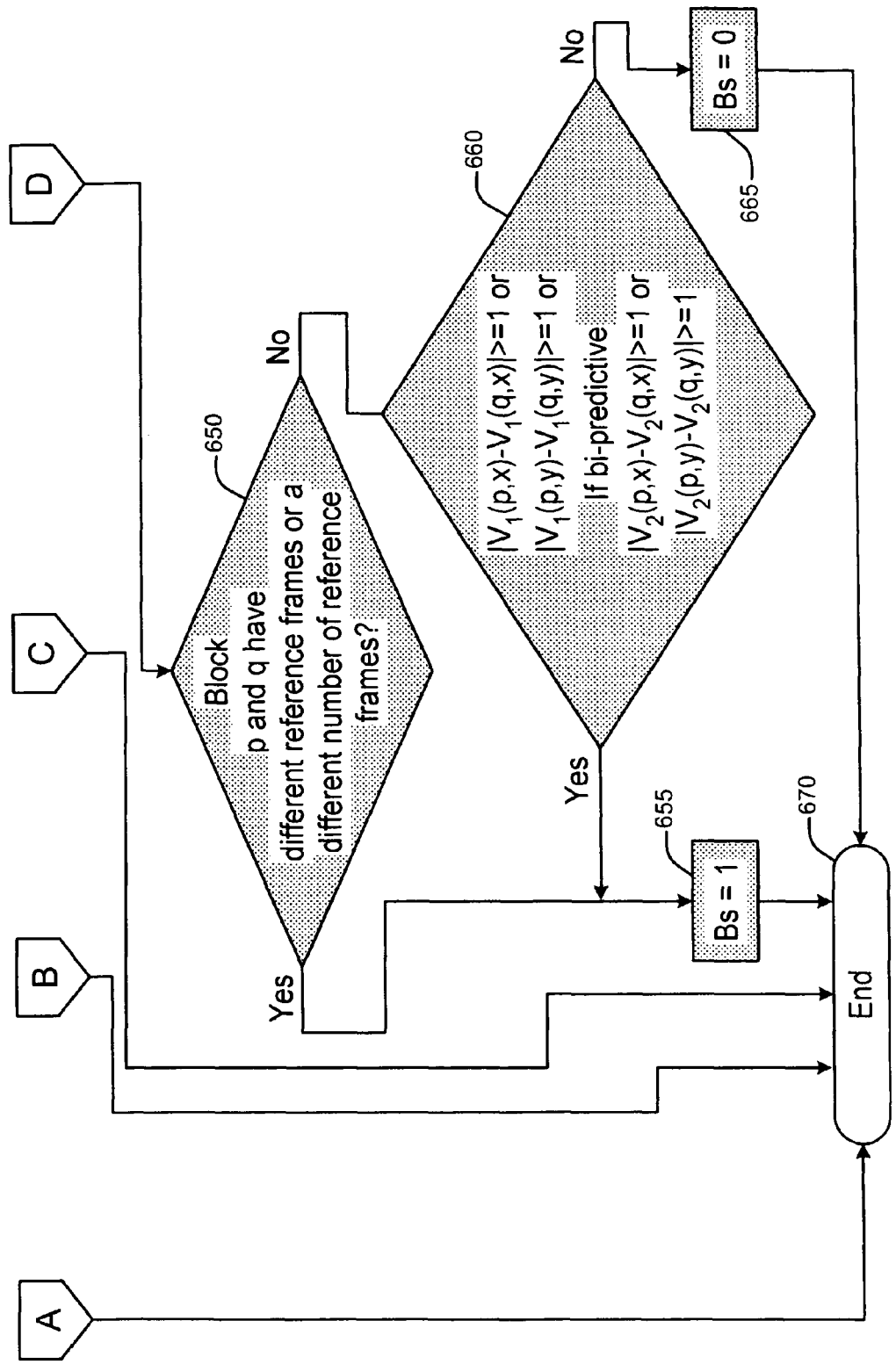

Turning to FIG. 6, an exemplary method for selecting the boundary strength based on prediction view information for use in Multi-view Video Coding is indicated generally by the reference numeral 600. In accordance with the method 600, the strength is adjusted according to the following exemplary coding parameters: reference views; edge position; block type; number of coded coefficients; reference frame index; and motion/disparity vector differences. It is to be noted that if the two neighboring blocks have different MVC prediction types, the highest boundary strength Bs=4 will be enforced. In general, the cross-view predicted block and temporal predicted block use reference pictures from different views, thus the block edge of two blocks with different MVC prediction types will more likely include higher level of blockiness. Thus, assigning higher boundary strength on these edges will give better filtering results.

The method 600 includes a start block 605 that passes control to a function block 610. The function block 610 examines the block boundary between blocks p and q, and passes control to a decision block 615. The decision block 615 determines whether or not block p or q is intra coded. If so, then control is passed to a decision block 620. Otherwise, control is passed to a decision block 635.

The decision block 620 determines whether or not the block boundary is a macroblock boundary. If so, then control is passed to a function block 625. Otherwise, control is passed to a function block 630.

The function block 625 sets the boundary strength to 4, and passes control to an end block 670.

The function block 630 sets the boundary strength to 3, and passes control to the end block 670.

The decision block 635 determines whether or not blocks p and q have difference reference views. If so, then control is passed to the function block 625. Otherwise, control is passed to the decision block 640. The decision block 640 determines whether or not the coefficients are coded in the blocks p and q. If so, then control is passed to a function block 645. Otherwise, control is passed to a decision block 650.

The function block 645 sets the boundary strength to 2, and passes control to the end block 670.

The decision block 650 determines whether or not blocks p and q have different reference frames or a different number of reference frames. If so, then control is passed to the function block 645. Otherwise, control is passed to a decision block 660.

The decision block 660 determines whether or not $|V_1(p,x)-V_1(q,x)|>=1$ or $|V_1(p,y)-V_1(q,y)|>=1$ or, if bi-predictive, $|V_2(p,x)-V_2(q,x)|>=1$ or $|V_2(p,y)-V_2(q,y)|>=1$. If so, then control is passed to function block 655. Otherwise, control is passed to a function block 665.

The function block 665 sets the boundary strength to 0, and passes control to the end block 670.

A description will now be given of some of the many attendant advantages/features of the present invention, some of which have been mentioned above. For example, one advantage/feature is a video encoder that includes a deblocking filter adaptable based on prediction information for encoding multi-view video sequences. Another advantage/feature is the video encoder as described above, wherein the prediction information comprises at least one of prediction type information and prediction view information. Yet another advantage/feature is the video encoder having the deblocking filter adaptable based on prediction information that includes at least one of prediction type information and prediction view information as described above, wherein the prediction type information comprises at least one of temporal prediction information and cross-view prediction information. Moreover, another advantage/feature is the video encoder having the deblocking filter adaptable based on prediction information that includes at least one of prediction type information and prediction view information as described above, wherein the deblocking filter is adaptable based upon the prediction information of two neighboring blocks with respect to a given block to be filtered by said deblocking filter. Further, another advantage/feature is the video encoder having the deblocking filter adaptable based on prediction information that includes at least one of prediction type information and prediction view information as described above, wherein the deblocking filter is compliant with the International Organization for Standardization/International Electrotechnical Commission Moving Picture Experts Group-4 Part 10 Advanced Video Coding standard/International Telecommunication Union, Telecommunication Sector H.264 recommendation, and a boundary strength applied by the deblocking filter is adaptable based upon the prediction information for encoding multi-view video sequences. Also, another advantage/feature is the video encoder compliant with the MPEG-4 AVC standard as described above, wherein the boundary strength is set to 4 when the prediction information of two neighboring blocks, with respect to a given block to be filtered by the deblocking filter, is different. Additionally, another advantage/feature is the video encoder as described above, wherein at least one of a boundary strength, a number of samples to be filtered, and a type of the deblocking filter is adaptable. Moreover, another advantage/feature is the video encoder having at least one of a boundary strength, a number of samples to be filtered, and a type of the deblocking filter being adaptable as described above, wherein the boundary strength of the deblocking filter is adaptable based upon the prediction information of two neighboring blocks with respect to a given block to be filtered by the deblocking filter, and the boundary strength is increased when the prediction information of the two neighboring blocks is different. Further, another advantage/feature is the video encoder as described above, wherein the multi-view video sequences include stereoscopic video sequences.

These and other features and advantages of the present invention may be readily ascertained by one of ordinary skill in the pertinent art based on the teachings herein. It is to be understood that the teachings of the present invention may be implemented in various forms of hardware, software, firmware, special purpose processors, or combinations thereof.

Most preferably, the teachings of the present invention are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention.

Although the illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

The invention claimed is:

1. A video encoder, comprising:
a deblocking filter to be applied on a given block of an image from a multi-view video sequence to be encoded based on cross-view prediction and temporal prediction, wherein said deblocking filter has a strength that can be controlled according to a comparison between a prediction type information associated with said given block, and a prediction type information associated with a neighborhood block of said given block, said prediction type information being either a temporal prediction information or a cross view prediction information, and wherein said strength is stronger when said prediction type information of said given block and said neighborhood block are different.

2. The video encoder of claim 1, wherein the prediction type information of said given block and said neighborhood block further comprises reference-view information.

3. The video encoder of claim 2, wherein said deblocking filter is compliant with the International Organization for Standardization/international Electrotechnical Commission Moving Picture Experts Group-4 Part 10 Advanced Video Coding standard/International Telecommunication Union, Telecommunication Sector H.264 recommendation, and said strength corresponds to a boundary strength.

4. The video encoder of claim 1, wherein the multi-view video sequences include stereoscopic video sequences.

5. A video encoding method for a given block of an image from a multi-view video sequence to be encoded on cross-view prediction and temporal prediction, the method comprising:
controlling a strength of a deblocking filtering to be applied on said given block according to a comparison between the prediction type information associated with said given block, and the prediction type information associated with a neighborhood block of said given block, said prediction type information being either a temporal prediction information or a cross view prediction information, and wherein said strength is stronger when said prediction type information of said given block and said neighborhood block are different.

6. The method of claim 5, wherein the prediction type information of said given block and said neighborhood block further comprises reference-view information.

7. The method of claim 6, wherein said deblocking filtering is compliant with the International Organization for Standardization/International Electrotechnical Commission Moving Picture Experts Group-4 Part 10 Advanced Video Coding standard/International Telecommunication Union, Telecommunication Sector H.264 recommendation, and said adapting step adapts a boundary strength of the deblocking filtering responsive to prediction information for encoding multi-view video sequences.

8. The method of claim 5, wherein the multi-view video sequences include stereoscopic video sequences.

9. A video decoder, comprising:
a deblocking filter to be applied on a given block of an image from a multi-view video sequence to be decoded based on cross-view prediction and temporal prediction, wherein said deblocking filter has a strength that can be controlled according to a comparison between a prediction type information associated with said given block, and a prediction type information associated with a neighborhood block of said given block, said prediction type information being either a temporal prediction information or a cross view prediction information, and wherein said strength is stronger when said prediction type information of said given block and said neighborhood block are different.

10. The video decoder of claim 9, wherein the prediction type information of said given block and said neighborhood block further comprises reference view information.

11. The video decoder of claim 10, wherein said deblocking filter is compliant with the International Organization for Standardization/International Electrotechnical Commission Moving Picture Experts Group-4 Part 10 Advanced Video Coding standard/International Telecommunication Union, Telecommunication Sector H.264 recommendation, and said strength corresponds to a boundary strength.

12. The video decoder of claim 9, wherein the multi-view video sequences include stereoscopic video sequences.

13. A video decoding method, for given block of an image from a multi-view video sequence to be decoded based on cross-view prediction and temporal prediction, the method comprising:
controlling a strength of a deblocking filtering to be applied on said given block, according to a comparison between a prediction type information associated with said given block, and a prediction type information associated with a neighborhood block of said given block, said prediction type information being either a temporal prediction information or a cross view prediction information, and wherein said strength is stronger when said prediction type information of said given block and said neighborhood block are different.

14. The method of claim 13, wherein the prediction type information of said given block and said neighborhood block further comprises reference-view information.

15. The method of claim 14, wherein said deblocking filtering is compliant with the International Organization for Standardization/International Electrotechnical Commission Moving Picture Experts Group-4 Part 10 Advanced Video Coding standard/International Telecommunication Union, Telecommunication Sector H.264 recommendation, and said strength corresponds to a boundary strength.

16. The method of claim 13, wherein the multi-view video sequences include stereoscopic video sequences.

* * * * *